May 8, 1934.   F. M. NIERLICH   1,957,551
ELECTRIC MOTOR
Filed April 17, 1930

INVENTOR
F. M. Nierlich
BY
ATTORNEY

Patented May 8, 1934

1,957,551

UNITED STATES PATENT OFFICE 1,957,551

ELECTRIC MOTOR

Fred M. Nierlich, Stamford, Conn., assignor to Electric Specialty Co., Stamford, Conn., a corporation of Delaware Application April 17, 1930, Serial No. 444,907

11 Claims. (Cl. 172—277)

My present invention relates generally to electric motors, and has particular reference to a synchronous motor of the induction type.

Although I have herein illustrated and shall hereinafter describe my invention as it relates to a motor, nevertheless it will be understood that as to certain phases of my invention it may be found applicable to electric dynamo machines in general.

It is a general object of my invention to provide an improved type of synchronous motor designed to operate at a substantially constant speed and having improved starting and running characteristics, a relatively high power factor, and of simple mechanical construction, resulting in increased efficiency of manufacture and use.

It is a more particular object of my invention to provide an improved machine capable of exerting a relatively great starting torque with a relatively small drainage of starting current.

A general feature of the invention lies in utilizing the advantageous characteristics of the commutator or repulsion-type motor, in combination with those of the well-known squirrel-cage type of induction motor to attain the practical advantages of both said types of motors, and to minimize the disadvantage of each. Synchronizing recesses and openings are preferably provided more adequately to assure synchronism.

In accordance with my present invention, I have provided a simplified dynamo electric machine which operates with high efficiency, which has a high power factor, a strong starting torque, a strong pull-in torque, and which utilizes less starting current and less running current than prior squirrel-cage split-phase and polyphase salient-pole synchronous motors.

The improved motor which my invention provides may be manufactured inexpensively and may be built to operate on either single-phase or polyphase current of any desired commercial voltage or frequency.

For the attainment of the foregoing objects and such other objects as may hereinafter appear or be pointed out, I have constructed a device embodying the features of my invention and illustrated in the accompanying drawing, wherein:—

Figure 1:
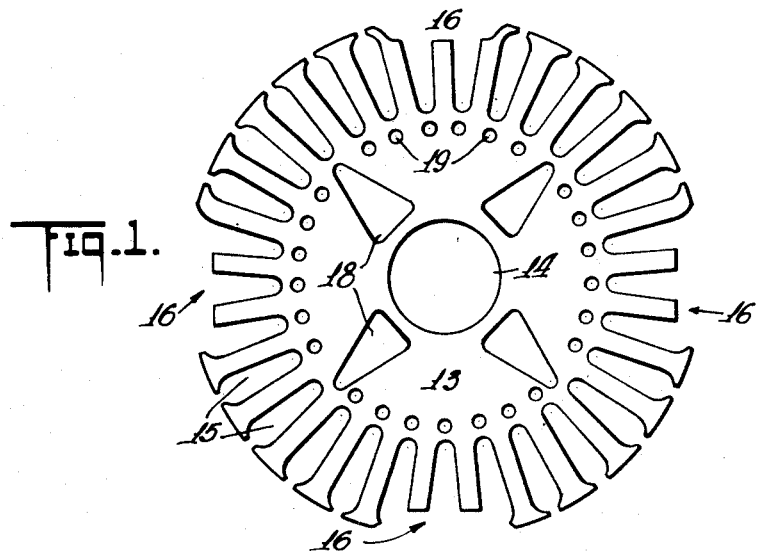
Figure 2:
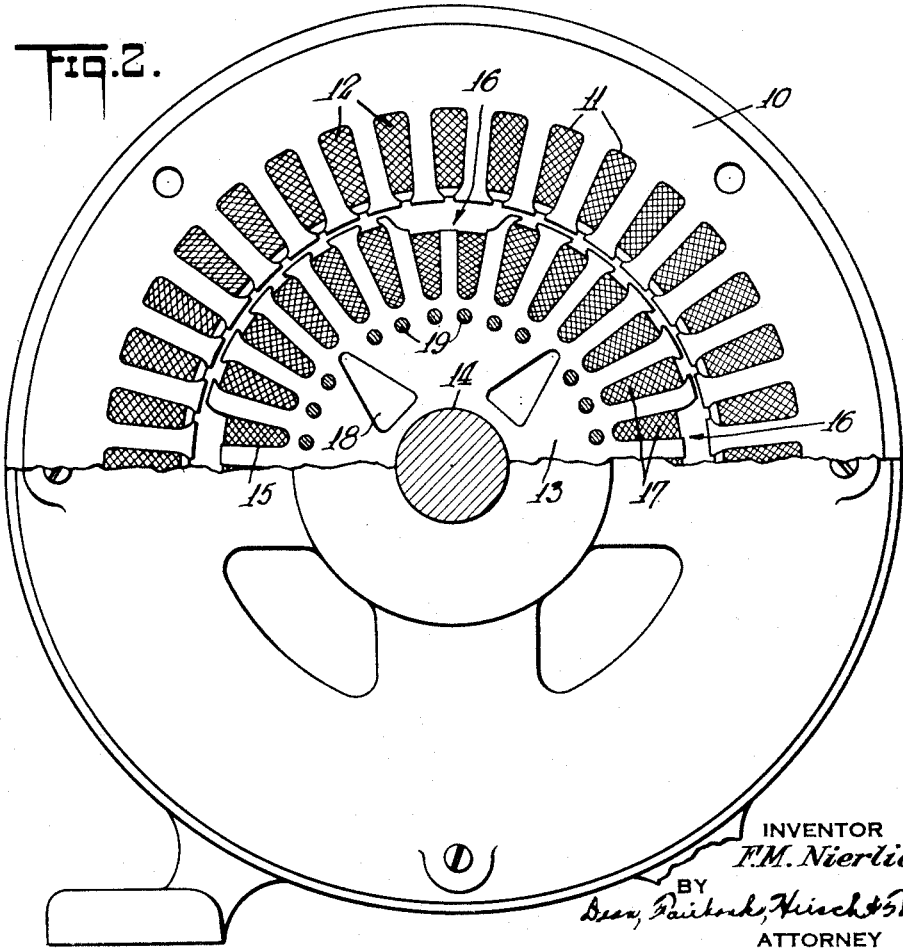

Fig. 1 is a front view of a rotor lamination embodying the features of my present invention; and Fig. 2 is a front view of a motor, partly in section, showing the relationships of the several windings and structural characteristics.

In the embodiment herein chosen for illustration, I have shown a motor construction having an annular stator of the type conventionally employed in motors of the repulsion and induction type. For example, in Fig. 2, it will be noted that the stator 10 is provided with the slots 11 arranged on its interior face, these slots being adapted to receive windings 12 which are suitably connected in the usual manner to an external source of supply current. The particular structure shown is substantially like the structure of the usual repulsion or of the usual induction motor.

The novel characteristics of my present invention will be more fully appreciated upon reference to Fig. 1, in which I have shown one of the laminations of which the rotor is constructed. The disc 13 is substantially circular in configuration, as is customary, and is provided with the central, axial opening 14 adapted to receive the hub or shaft of the motor. The periphery is provided with radial slots 15 which extend completely around the disc. At circumferentially-spaced intervals the length of certain of the teeth or projections is reduced which define the slots 15, thereby producing a series of marginal recesses 16. Four of these recesses are shown by way of example in the illustrated embodiment but a lesser or greater number of these slots may be used to advantage. Each recess is shown of width at least as great as two of the slots 15 although the invention is not limited to making the recess of said width. When the rotor laminations are assembled, in the usual manner, the recesses 16 register with corresponding recesses in other laminations and provide a composite, axial recess arranged in the outer surface or periphery of the rotor structure.

The slots 15 are adapted to receiving windings, and in accordance with my present invention, these windings are of the usual repulsion-motor type. In Fig. 2, these windings are designated by the reference numeral 17.

Arranged around the central opening 14 of the disc 13 are a series of relatively large holes or openings 18 adapted to register with similar openings in the remaining laminations of the structure to provide a set of openings or holes extending longitudinally through the core of the rotor. In the illustrated embodiment, four of these openings 18 are shown equally spaced in a circumferential manner, and staggered with relationship to the recesses 16 previously referred to. The marginal recesses 16 and the axial openings 18 serve as synchronizing recesses and openings by guiding the magnetic flux through the desired paths.

In a preferred construction herein illustrated, the rotor also carries a squirrel-cage winding;

and to accommodate the copper bars of such a cage, a set of circumferentially-arranged holes 19 is provided in each disc 13, the holes 19 being relatively small as compared with the holes 18 and being arranged radially inside of the slots 15.

Thus, when the rotor structure has been assembled, and the several windings applied thereto, a cooperative association is provided between the repulsion-motor winding, the squirrel-cage winding, and the synchronizing recesses and holes.

When the motor is started, a very strong torque is exerted by virtue of the repulsion-motor windings 17. The synchronizing recesses 16 prevent the rotor from running too fast or too slow with respect to the synchronous speed of the machine, but inasmuch as the synchronizing effect of these recesses alone may not be sufficient to carry a load commensurate with the size of the machine, I adjust the brushes so that the repulsion-winding contributes a strong torque and tends to accelerate the rotor above synchronous speed. Accordingly, at light loads, the rotor will tend to lead with respect to the amplitude of the stator flux; but as the load increases the rotor changes the relative phase angle with respect to the amplitude of the flux, and under heavy overload conditions the rotor tends to lag and to drop out of synchronism.

The foregoing action of the repulsion-winding, with properly set brushes, not only contributes greatly to an increase of the rotor torque, but serves to improve the power factor and efficiency of the motor to a degree heretofore unattained by synchronous motors, without direct current excitation.

The cage-winding has a stabilizing effect under heavy loads, tending to maintain the rotor at synchronous speed and counteracting its tendency to lag. Accordingly, the cage-winding serves to increase the torque which the rotor delivers at synchronous speed.

It will thus be seen that I have provided a motor of greatly improved characteristics and of simple, inexpensive, yet staunch construction. No auxiliary apparatus is required for starting; no direct current excitation is needed; and yet, the starting torque is greater while the starting current is reduced to about one-third. Furthermore, the power factor is practically doubled; the running current is reduced by about fifty per cent; and the general efficiency of the motor is increased by at least twenty per cent.

Although I have shown separate openings in the rotor to accommodate the cage-winding, where such winding is employed, it will be understood that this winding may, if desired, be laid in the slots that accommodate the repulsion-motor winding.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention and illustrated its use, what I claim as new and desire to secure by Letters Patent is:—

1. In a synchronous motor, a rotor comprising a laminated structure provided with a set of circumferentially-spaced longitudinal synchronizing recesses in its outer surface, and a set of repulsion-motor windings carried by said rotor at said surface, the rotor having slots therein to receive said windings, some of said slots lying at the bottom of said recesses.

2. In a synchronous motor, a rotor comprising a laminated structure provided with a set of circumferentially spaced longitudinal synchronizing recesses in its outer surface, a squirrel cage-winding carried by said rotor, and disposed closer to the axis of said rotor than are said recesses, and windings carried by the rotor, some of which lie between the squirrel cage-winding and the recesses.

3. In a synchronous motor, a rotor comprising a laminated structure provided with a set of circumferentially-spaced longitudinal synchronizing recesses in its outer surface, a set of repulsion-motor windings carried by said rotor, some of said windings being at the bottom of said recesses, and a squirrel cage-winding carried by said rotor beneath the first named windings.

4. In a synchronous motor, a rotor comprising a laminated structure provided with a set of circumferentially spaced longitudinal synchronizing recesses in its outer surface, said structure being provided also with a series of synchronizing holes extending longitudinally therethrough, and a set of repulsion-motor windings carried peripherally by said rotor structure.

5. In a synchronous motor, a rotor comprising a laminated structure provided with a set of circumferentially-spaced longitudinal synchronizing recesses in its outer surface, said structure being provided also with a separate series of open synchronizing holes extending axially therethrough, windings at the bottom of said recesses and a squirrel cage-winding carried by said structure.

6. In a synchronous motor, a rotor comprising a laminated structure provided with a set of circumferentially-spaced longitudinal synchronizing holes extending through the core thereof, and a set of repulsion-motor windings and also a squirrel cage-winding carried by said structure between said holes and said repulsion motor windings.

7. In a synchronous motor, a rotor comprising a laminated structure provided with a set of circumferentially-spaced longitudinal synchronizing recesses in its outer surface, said structure being provided also with a series of synchronizing holes extending axially therethrough, a repulsion-motor winding carried peripherally by said rotor structure, and a squirrel-cage winding beneath said first-named winding.

8. A synchronous motor comprising an annular stator, a set of windings carried along the interior surface thereof, a rotor having a slotted periphery, a set of repulsion-motor windings in said slots, and a squirrel cage-winding carried by said rotor beneath said repulsion-motor windings; said rotor being provided with a set of longitudinal synchronizing recesses in its peripheral surface, and with a set of synchronizing holes extending longitudinally through the core thereof.

9. A synchronous motor comprising an annular stator, a set of windings carried along the interior surface thereof, a rotor having a slotted periphery, a set of repulsion-motor windings in said slots, and a squirrel cage-winding carried by said rotor beneath said repulsion-motor windings; said rotor being provided with a set of longitudinal synchronizing recesses in its peripheral surface, and with a set of synchronizing holes extending longitudinally through the core thereof; said recesses and said holes being arranged at staggered intervals around the axis of said rotor.

10. A rotor lamination comprising a substantially circular disc with a slotted periphery, said disc being provided with a set of marginal recesses arranged at spaced intervals, and said disc being provided with a central opening and with a separate set of relatively large unoccupied openings arranged in spaced relationship around said central opening, and windings at the bottom of said recesses.

11. A rotor lamination comprising a substantially circular disc with a slotted periphery, said disc being provided with a set of marginal recesses arranged at spaced intervals, said disc being provided with a set of circumferentially-arranged holes lying radially inwardly of said slots, and said disc being also provided with a series of relatively large holes circumferentially arranged relatively close to the center of the disc.

FRED M. NIERLICH.